United States Patent
Marchetti et al.

(10) Patent No.: US 11,155,057 B2
(45) Date of Patent: Oct. 26, 2021

(54) MULTI-MATERIAL BLOW MOLDING SPLIT EXTRUSION HEAD AND PROCESS

(71) Applicant: Ford Global Technologies, LLC, Dearborn, MI (US)

(72) Inventors: Bernard Gerard Marchetti, Rochester Hills, MI (US); Charles Alan Rocco, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 589 days.

(21) Appl. No.: 15/622,406

(22) Filed: Jun. 14, 2017

(65) Prior Publication Data
US 2018/0361626 A1     Dec. 20, 2018

(51) Int. Cl.
| | |
|---|---|
| *B32B 1/08* | (2006.01) |
| *F02M 35/10* | (2006.01) |
| *B29C 49/04* | (2006.01) |
| *B29C 49/00* | (2006.01) |
| *B60H 1/00* | (2006.01) |

(Continued)

(52) U.S. Cl.
CPC ............ *B32B 1/08* (2013.01); *B29C 49/0005* (2013.01); *B29C 49/04* (2013.01); *B32B 1/02* (2013.01); *B60H 1/00557* (2013.01); *B60H 1/00564* (2013.01); *F02M 35/10* (2013.01); *F02M 35/104* (2013.01); *B29B 17/0005* (2013.01); *B29C 49/72* (2013.01); *B29K 2077/00* (2013.01); *B29K 2307/04* (2013.01); *B29L 2031/3032* (2013.01)

(58) Field of Classification Search
CPC ............ B60H 1/00557; B60H 1/00564; F02M 35/10; F02M 35/10091; F02M 35/10144; F02M 35/1015; F02M 35/104; B32B 1/02; B32B 1/08
See application file for complete search history.

(56) References Cited

U.S. PATENT DOCUMENTS

| | | | |
|---|---|---|---|
| 4,794,148 A * | 12/1988 | Nakamura | ........... C07D 403/04 525/397 |
| 5,156,796 A | 10/1992 | Nakagawa et al. | |

(Continued)

FOREIGN PATENT DOCUMENTS

EP     0385942     9/1990

OTHER PUBLICATIONS

Product overview for Injection Blow Molding of Multi-Component Parisons, Kunststoffeinternational.com, Jun. 17, 2014, Kunststoffe International, Hanser Publications, Carl Hanser Verlag GmbH & Co. Kg, Kolbergerstrasse 22, 81679 Munich, DE.

*Primary Examiner* — Walter Aughenbaugh
(74) *Attorney, Agent, or Firm* — Burris Law, PLLC (57) ABSTRACT

A blow molded part is provided that includes a first portion consisting of a reinforced resin and a second portion consisting of a non-reinforced resin. The reinforced resin may be fiber-reinforced, and the non-reinforced resin may be a neat resin. In one form, the first portion and the second portion define first and second trim areas, respectively, and the second trim area is directly recyclable. In another form, the second portion comprises a material consisting of a non-reinforced resin and/or a reinforced resin, where the modulus of elasticity of the first portion is higher than the modulus of elasticity of the second portion. Furthermore, a method of forming a blow molded part is provided.

19 Claims, 5 Drawing Sheets

Parison Split Ex. 1

Resultant Blow Molded Shape Ex. 1

(51) Int. Cl.
  *F02M 35/104*  (2006.01)
  *B32B 1/02*    (2006.01)
  *B29C 49/72*       (2006.01)
  *B29K 77/00*       (2006.01)
  *B29K 307/04*      (2006.01)
  *B29L 31/30*       (2006.01)
  *B29B 17/00*       (2006.01)

(56) References Cited

U.S. PATENT DOCUMENTS

| | | | |
|---|---|---|---|
| 6,090,338 A | 7/2000 | Wrobbel et al. | |
| 6,174,470 B1 | 1/2001 | Plymale et al. | |
| 6,663,822 B1 * | 12/2003 | Cargill | B29C 49/0005 |
| | | | 264/515 |
| 2005/0005890 A1 * | 1/2005 | Asfaw | F02M 35/10144 |
| | | | 123/184.61 |

* cited by examiner

MULTI-MATERIAL BLOW MOLDING SPLIT EXTRUSION HEAD AND PROCESS

FIELD

The present disclosure relates generally to blow molding and more particularly to two-dimensional blow molding.

BACKGROUND

The statements in this section merely provide background information related to the present disclosure and may not constitute prior art.

Manufacturing hollow plastic parts or components using two-dimensional (2D) blow molding technology is widely used in the automotive industry. Blow molding allows for fast production of complex parts at a lower cost. Manufacturing automotive HVAC (Heating, Ventilation, and Air Conditioning) air ducts used in an instrument panel is one example of a common 2D blow molded part.

The 2D blow molding process involves melting plastic material and extruding the melted plastic material into a hollow tube or parison. The parison is dropped into an open mold and cooled. Once the mold is closed and the parison is sufficiently cooled, the parison is inflated by blowing pressurized gas, typically air, into the parison, thereby shaping the parison to a desired shape. The mold then clamps down onto the plastic and forms the edges of the part being manufactured. Once the plastic is cooled, the mold is opened and the part is ejected.

A large amount of material is usually trimmed away from the final part in 2D blow molding. It is common for the total mass of the trimmed material to be 50% or more of the total mass of the final ejected part. However, for most blow molded components, the materials used are non-reinforced resins and can be recycled because any degradation in their mechanical properties does not adversely affect the final molded component.

A challenge associated with 2D blow molding is the use of more expensive materials having higher mechanical properties, such as high modulus glass or carbon fiber reinforced resins, and the inability to easily recycle these composite materials that generally form outside a trim line. The recycling challenges associated with reinforced resins in 2D blow molding, among other challenges, is addressed by the present disclosure.

SUMMARY

The present disclosure provides for a blow molded part comprising a first portion consisting of a reinforced resin and a second portion consisting of a non-reinforced resin. In one form, the reinforcement is a fiber and the non-reinforced resin is a neat resin. The blow molded part may also include a third portion consisting of a non-reinforced resin. The first portion and the second portion define first and second trim areas, respectively, wherein the second trim area is directly recyclable. In one form, the total volume of the first portion is greater than a total volume of the second portion. The reinforced resin in one form includes reinforcements selected from the group consisting of fibers, nanotubes, columns, particles, and combinations thereof. Further, the reinforced resin may comprise reinforcements of discontinuous fibers. The resin of the first portion and the second portion are a thermoplastic material in one form of the present disclosure.

In another form, a blow molded part is provided wherein the blow molded part is a structural component selected from the group consisting of an air duct, grille opening reinforcements, and instrument panel cross-car beams. The blow molded part in one form is an air duct having a primary duct and secondary ducts, and the first portion of a reinforced resin is disposed proximate the primary duct and the second portion of non-reinforced resin is disposed proximate the secondary ducts.

In yet another form of the present disclosure, a blow molded part is provided having a first portion consisting of a reinforced resin and a second portion comprising a material selected from the group consisting of a non-reinforced resin and a reinforced resin, wherein a modulus of elasticity of the first portion is higher than a modulus of elasticity of the second portion. Each of the first portion and the second portion define first and second trim areas, respectively, wherein the second trim area is directly recyclable. The reinforced resins comprise reinforcements selected from the group consisting of fibers, nanotubes, columns, particles, and combinations thereof. In one form, the fibers are carbon or glass, and in another variant, the reinforced resin comprises discontinuous fibers. The resins of the first and second portions are a thermoplastic material. In one example, the blow molded part is an air duct.

In still another form of the present disclosure, a method of forming a blow molded part is provided and comprises the steps of extruding a first material consisting of a reinforced resin from a first screw and barrel assembly into a die while simultaneously extruding a second material consisting of a non-reinforced resin from a second screw and barrel assembly into the die, wherein the first material and the second material form a hybrid parison, and extruding the hybrid parison within the die. This method is a 2D blow molding method. The method further comprises the step of removing a trim area from the blow molded part proximate the second material and directly recycling the trim area. The first material and the second material are selectively extruded at predetermined locations within the die and a rate of extrusion of the first material and the second material are each constant.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
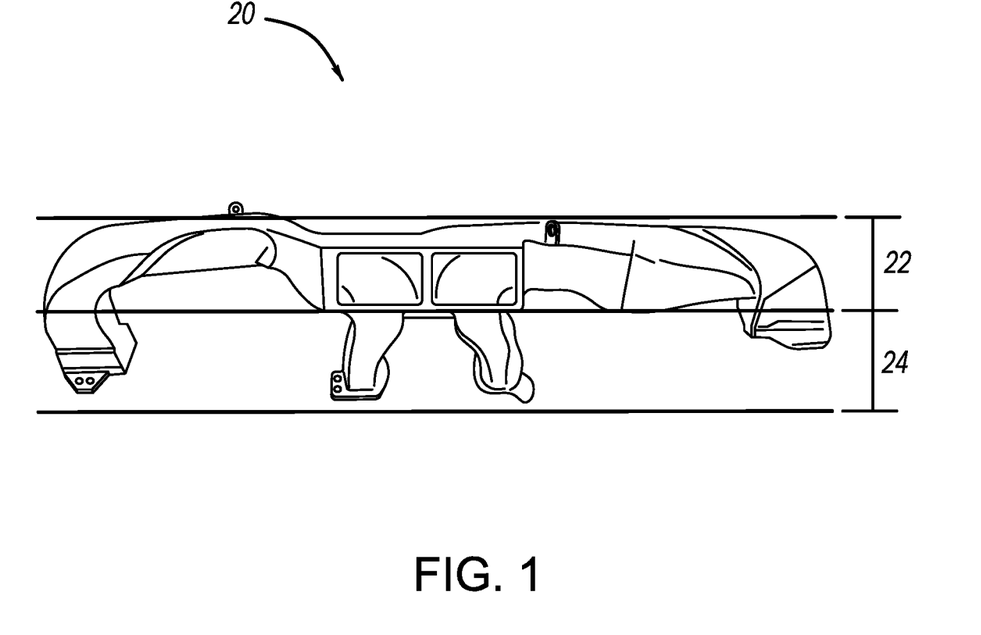
FIG. 1 is a perspective view illustrating one form of a multi-material blow molded part, an air duct for a motor vehicle, in accordance with the teachings of the present disclosure.
Figure 2:
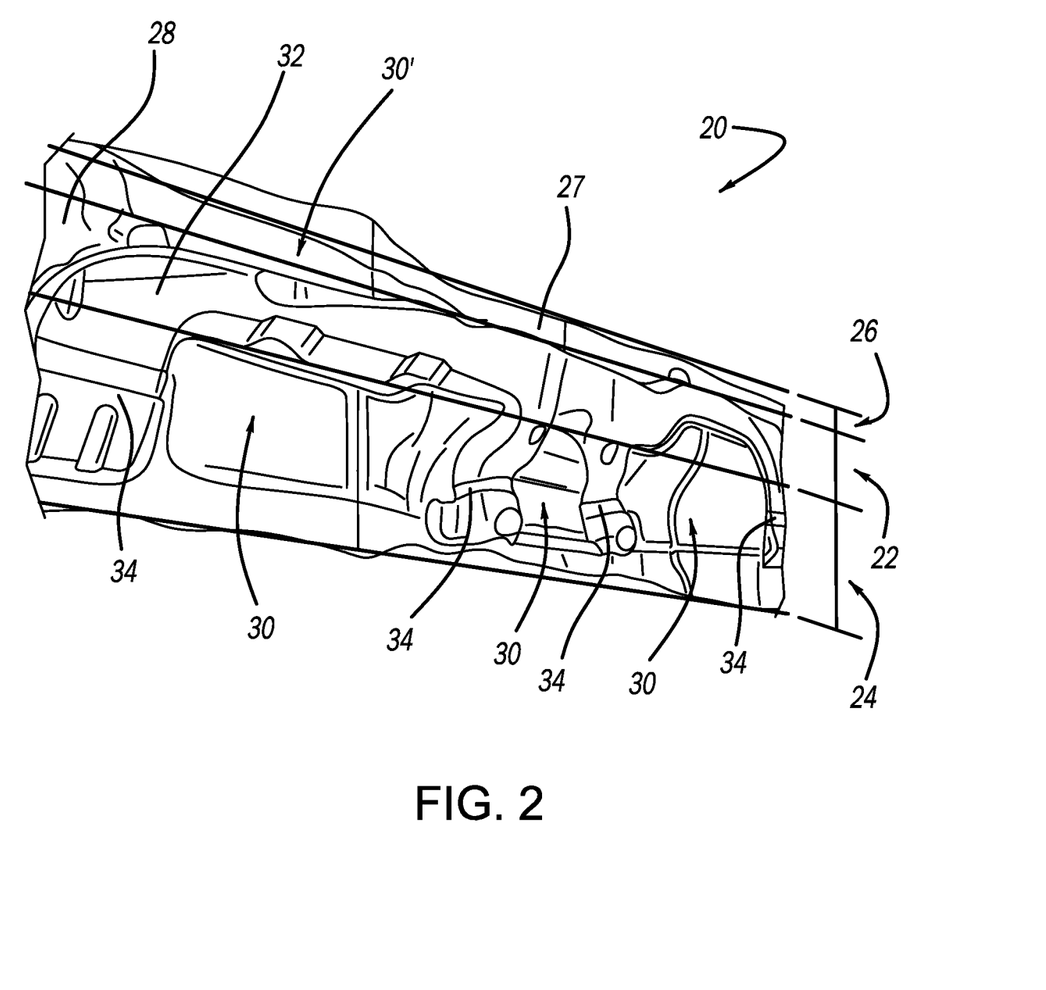
FIG. 2 is a perspective view of a multi-material blow molded part illustrating material to be trimmed away in accordance with the teachings of the present disclosure.

Referring to FIGS. 1 and 2, one form of a multi-material blow molded part according to the present disclosure is illustrated and generally indicated by reference numeral 20. The multi-material blow molded part 20 comprises a first portion 22 consisting of a reinforced resin and a second portion 24 consisting of a non-reinforced resin. In one form, the reinforced resin of the first portion 22 is fiber-reinforced with carbon fibers, and the non-reinforced resin of the second portion 24 is a neat resin. Generally, the resins of each of the first portion 22 and the second portion 24 are compatible such that they can adhere to each other in the blow molding process. In one example, the first portion 22 is a carbon-fiber reinforced polyamide (PA66), and the second portion is a neat PA66. In other forms, the reinforcements may be nanotubes, columns, particles, and combinations thereof. The nanotubes may be carbon, and other materials may include, by way of example, natural fibers and basalt. In one form, the reinforcements are discontinuous fibers and may be carbon and/or glass.

As further shown, the first portion 22 defines a first trim area 28 and the second portion 24 defines and a second trim area 30, wherein the second trim area 30 is directly recyclable. The second trim area 30 is directly recyclable because it does not contain any reinforcements and thus can be trimmed, processed (into smaller pieces), and directly placed back into a 2D blow molding apparatus. The first trim area 28 contains reinforcements, and while this trim area can still be recycled, the material in the trim area must undergo additional testing to ensure the reinforcements and the resin are properly segregated and/or further processed for subsequent recycling. Therefore, as used herein, the term "directly recyclable" should be construed to mean that the material can be directly placed into a subsequent molding apparatus, such as a 2D blow molding apparatus, without any additional material testing and potential processing except for a reduction in size (chopping, cutting, etc.).

Generally, the reinforced resin is a high-performance material, such as for example a carbon fiber filled polyamide, among others, with high mechanical properties including high tensile modulus. For example, such reinforced resins have a tensile modulus, or modulus of elasticity, ranging between 4 GPa to over 30 GPa, and an ultimate tensile strength (UTS) ranging between 20 MPa to over 250 MPa. In one form, a fiber-reinforced resin comprises fibers selected from the group consisting of carbon, glass, and combinations thereof. In one variation, the fiber-reinforced resin comprises discontinuous fibers. In another variation, the fiber-reinforced resin comprises continuous fibers.

Generally, the non-reinforced resin is an inexpensive and lower performance material, such as for example a neat resin without reinforcements, which can be directly recycled. Therefore, material in the second trim area 30 that is trimmed away from the final part can be directly recycled.

In other forms, the resin of the first portion 22 and the non-reinforced resin of the second portion 24 are thermoplastic materials. However, the present disclosure is not limited to thermoplastic material and other materials, such as by way of example thermoset resins, may be implemented while remaining within the scope of the present disclosure.

In another form, the second portion 24 comprises a material selected from the group consisting of a non-reinforced resin and a reinforced resin, wherein the modulus of elasticity of the first portion 22 is higher than a modulus of elasticity of the second portion 24. In this way, the second portion 24 may also include reinforcements, such as those set forth above, such that both the first and second portions 22 and 24, are both reinforced but one area has greater mechanical properties than the other. It should also be understood that more than two portions may be present in a blow molded part while remaining within the scope of the present disclosure, and thus the illustration and description of the first and second portions 22 and 24, and their respective trim areas 28 and 30, are merely exemplary. Accordingly, the present disclosure may include a plurality of portions having different strengths, and with corresponding trim areas, while remaining within the scope of the present disclosure.

For exemplary purposes, the multi-material blow molded part 20 illustrated in FIGS. 1 and 2 is a multi-material blow molded air duct 20 that could be integrated into the design of an instrument panel of a motor vehicle. In this form, the first portion 22 further defines a primary duct 32 and the second portion 24 further defines secondary ducts 34, wherein the first trim area 28 is disposed proximate the primary duct 32 and the second trim area 30 is disposed proximate the secondary ducts 34.

Additionally, the air duct 20 further comprises a third portion 26 consisting of a non-reinforced resin (which may be a neat resin) and defines at least one third duct 27 and a third trim area 30' disposed proximate the third duct 27, wherein the third trim area 30' is directly recyclable.

It should be understood that the blow molded part 20 taking the form of an air duct is merely exemplary and other blow molded parts may be employed while still remaining within the scope of the present disclosure. For example, vehicle body structural components such as grille opening reinforcements and instrument panel cross-car beams may be configured and manufactured according to the teachings of the present disclosure. Furthermore, although the blow molded air duct 20 is shown as having a first, second and third portion 22, 24 and 26, the blow molded part 20 may have additional portions, where each additional portion consists of at least one of a reinforced resin, a non-reinforced resin, and combinations thereof, wherein the non-reinforced resin is directly recyclable while still remaining within the scope of the present disclosure.

Figure 3:
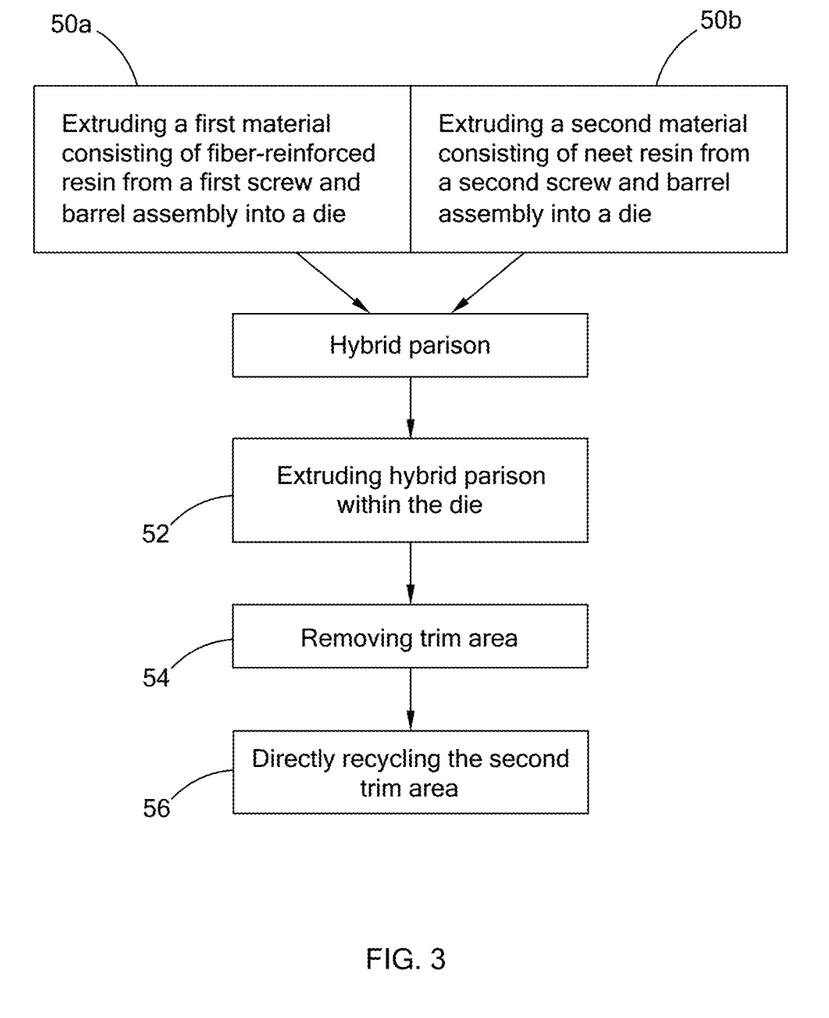
FIG. 3 is a flow diagram illustrating a method of forming a multi-material blow molded part in accordance with the teachings of the present disclosure.

Referring to FIG. 3, the present disclosure further includes a method of forming a multi-material blow molded part 20. In this method, two-dimensional (2D) blow molding is employed however the present disclosure is not limited to 2D blow molding and other methods may be employed while remaining within the scope of the present disclosure.

Generally, the method includes the steps of extruding a first material consisting of a reinforced resin from a first screw and barrel assembly into an extrusion head in step 50a, and simultaneously extruding a second material consisting of non-reinforced resin from a second screw and barrel assembly into an extrusion head in step 50b, wherein the first material and second material form a hybrid parison. Next, the hybrid parison is extruded within a die in step 52, and the trim areas are removed from a blow molded part in step 54. The method further includes the step of removing the trim area from the blow molded part proximate the second material and directly recycling the trim area in step 56.

Figure 4:
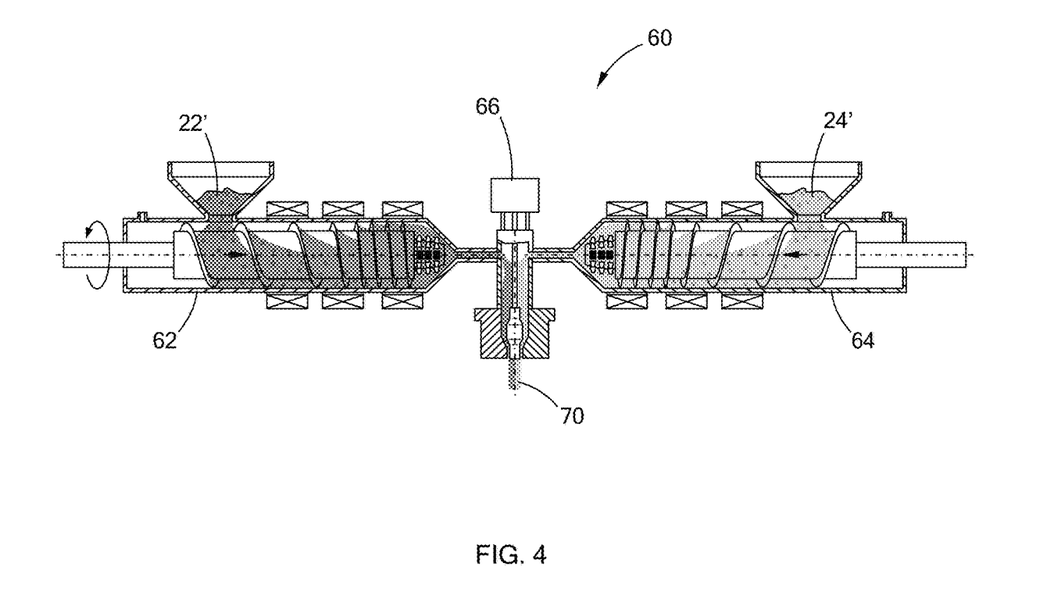
FIG. 4 is a diagram illustrating a multi-material blow molded split extrusion apparatus constructed in accordance with the teachings of the present disclosure.

Referring to FIG. 4, a multi-material blow molded split extrusion apparatus constructed in accordance with the teachings of the present disclosure is illustrated and generally indicated by reference numeral 60. This apparatus 60 is employed in performing the method of forming a multi-material blow molded part 20 as shown in FIG. 3. The multi-material blow molded split extrusion 60 comprises a first screw and barrel assembly 62 and a second screw and barrel assembly 64, wherein both assemblies 62 and 64 are attached to a blow mold extruder 66. The first material consisting of reinforced resin 22' is extruded from the first screw and barrel assembly 62 and a second material consisting of a non-reinforced resin 24' is extruded from the second screw and barrel assembly 64 simultaneously. The first material 22' and the second material 24' may be selectively extruded at predetermined locations within the die to form a hybrid or multi-material parison 70 as described in greater detail below. In one form, the rate of extrusion of the first and second material 22' and 24' are each constant. Alternatively, the rate of extrusion of the first and second material 22' and 24' are not constant.

Referring back to FIG. 2, in one form, the hybrid parison 70 is molded into a multi-material blow molded part 20 wherein the total volume of the first portion 22 is greater than the total volume of the second portion 24. In other words, the total volume of the primary duct 32 of the first portion 22 is greater than the total volume of the secondary ducts 34 of the second portion 24 and the total volume of the second trim area 30 of the second portion 24 is greater than the total volume of the first trim area 28 of the first portion 22. This form is merely exemplary, and thus it should be understood that the total volume of the second portion 24 may be greater than the first portion 22 while remaining within the scope of the present disclosure.

The first portion 22 has a reduced trim area 28 thereby reducing the loss or waste of high-performance material that may or may not be directly recyclable. The majority of the material to be trimmed is situated in the second trim area 30, which comprises the lower cost material that is directly recyclable. Accordingly, the unique configuration of the multi-material blow molded air duct 20 having a primary duct 32 comprising high performance material provide an air duct that may be integrated into the design of an instrument panel and potentially replace a conventional steel cross car beam.

Figure 5A:
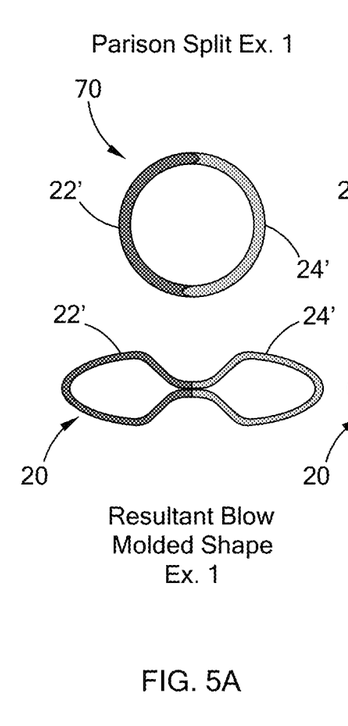
FIGS. 5A-5C are cross-sectional views of various hybrid parison splits and corresponding resultant multi-material blow molded shapes in accordance with the teachings of the present disclosure.
Figures 5B, 5C:
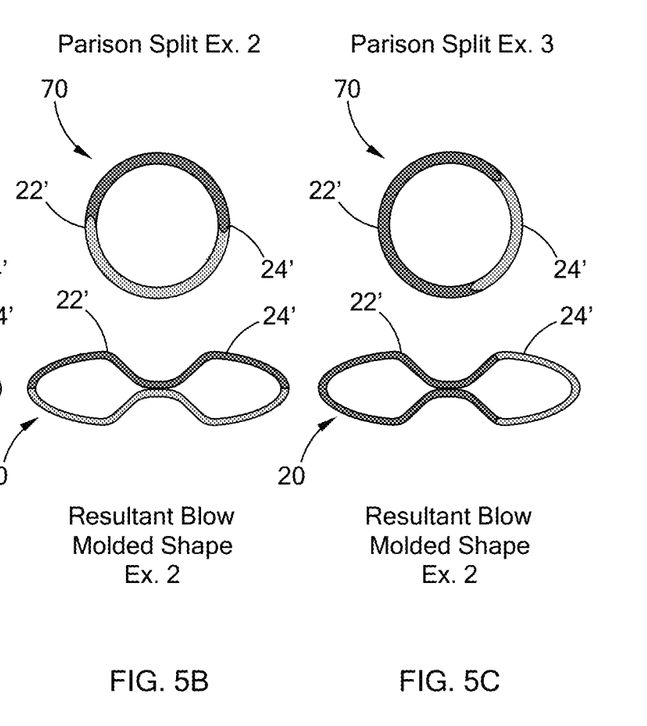

Referring to FIGS. 5A-5C, cross-sectional views of various hybrid parison 70 splits and the resultant multi-material parts 20 are illustrated. The step of simultaneously extruding the first and second materials into an extrusion head 50, as shown in FIG. 3, may be selectively extruded at predetermined locations within the die. The ratio of the first and second material 22' and 24' is determined by the final product design in order to improve performance and reduce the waste material to be trimmed from the first material 22' comprising higher performance material.

In FIGS. 5A and 5B, the hybrid parison 70 is circular or ring shaped and the first material and second material 22' and 24' are selectively extruded at a predetermined location such that a 50/50 ratio results in which one half of the hybrid parison comprises reinforced resin 22' and one half comprises non-reinforced resin 24'.

In FIG. 5C, the hybrid parison 70 is circular and the first and second material 22' and 24' are selectively extruded at a predetermined location such that the ratio of the first material 22' is larger than the ratio of the second material 24'. The ratio of the first and second materials 22' and 24', and their specific predetermined locations within the hybrid parison 70, is not limited to the examples illustrated herein. Accordingly, the unique configuration of the multi-material blow molded part 20 comprising high performance material with a reduced trim area and a lower performance material with a trim area that is directly recyclable allows for the manufacturing of high performance complex parts that are more cost effective. More specifically, the high performance material is employed only in those areas that should have higher strength, thus providing a lower cost solution versus a part that is all high performance material.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A blow molded part comprising:
   a first portion consisting of a carbon-fiber reinforced polyamide; and
   a second portion consisting of a neat polyamide, wherein the carbon-fiber reinforced polyamide has a modulus of elasticity of greater than or equal to about 4 GPa to less than or equal to about 30 GPa.

2. The blow molded part according to claim 1 further comprising a third portion consisting of a non-reinforced resin.

3. The blow molded part according to claim 1, wherein each of the first portion and the second portion define first and second trim areas, respectively, wherein the second trim area is directly recyclable.

4. The blow molded part according to claim 1, wherein the reinforcement is at least one selected from the group consisting of fibers, nanotubes, columns, particles, and combinations thereof.

5. The blow molded part according to claim 1, wherein the resin of the first portion and the second portion are a thermoplastic material.

6. The blow molded part according to claim 1, wherein the carbon-fiber reinforced polyamide comprises reinforcements of discontinuous fibers.

7. The blow molded part according to claim 1, wherein the blow molded part is a structural component selected from the group consisting of an air duct, grill opening reinforcements, and instrument panel cross-car beams.

8. The blow molded part according to claim 7, wherein the blow molded part is an air duct having a primary duct and secondary ducts, and the first portion of the carbon-fiber reinforced polyamide is disposed proximate the primary duct and the second portion of non-reinforced resin is disposed proximate the secondary ducts.

9. The blow molded part according to claim 1, wherein a total volume of the first portion is greater than a total volume of the second portion.

10. A blow molded part comprising:
    a first portion consisting of a carbon-fiber reinforced polyamide; and
    a second portion comprising a neat polyamide, wherein a modulus of elasticity of the first portion is higher than a modulus of elasticity of the second portion, wherein the carbon-fiber reinforced polyamide has a modulus of elasticity of greater than or equal to about 4 GPa to less than or equal to about 30 GPa.

11. The blow molded part according to claim 10, wherein each of the first portion and the second portion define first and second trim areas, respectively, wherein the second trim area is directly recyclable.

12. The blow molded part according to claim 10, wherein the reinforcement is at lest one selected from the group consisting of fibers, nanotubes, columns, particles, and combinations thereof.

13. The blow molded part according to claim 10, wherein the resins of the first and second portions are a thermoplastic material.

14. The blow molded part according to claim 10, wherein the reinforced resin comprises reinforcements of discontinuous fibers.

15. The blow molded part according to claim 10, wherein the blow molded part is an air duct.

16. The part according to claim 1, wherein the first portion is extruded from a first screw and barrel assembly into a die, and the second portion is simultaneously extruded from a second screw and barrel assembly into the die, and the part is extruded from the die.

17. The part according to claim 16, wherein the part is 2D blow molded.

18. The part according to claim 16, wherein the first portion and the second portion are selectively extruded at predetermined locations within the die.

19. The part according to claim 16, wherein a rate of extrusion of the first portion and the second portion are each constant.

* * * * *